United States Patent
Kitazoe et al.

(10) Patent No.: US 9,924,395 B2
(45) Date of Patent: Mar. 20, 2018

(54) DIFFERENTIATING MEASUREMENT REPORTING MECHANISM

(71) Applicant: QUALCOMM Incorporated, San Diego, CA (US)

(72) Inventors: Masato Kitazoe, Hachiouji (JP); Kurt William Otte, Erie, CO (US); Arvind Swaminathan, San Deigo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 13/952,521

(22) Filed: Jul. 26, 2013

(65) Prior Publication Data

US 2014/0036707 A1 Feb. 6, 2014

Related U.S. Application Data

(60) Provisional application No. 61/677,726, filed on Jul. 31, 2012.

(51) Int. Cl.
*H04W 24/10* (2009.01)
*H04W 36/00* (2009.01)

(52) U.S. Cl.
CPC ....... *H04W 24/10* (2013.01); *H04W 36/0088* (2013.01)

(58) Field of Classification Search
CPC .... H04L 5/0053; H04W 24/02; H04W 24/08; H04W 24/10; H04W 36/0083
See application file for complete search history.

(56) References Cited

U.S. PATENT DOCUMENTS

| | | | |
|---|---|---|---|
| 5,960,354 A | 9/1999 | Einola | |
| 2009/0047968 A1* | 2/2009 | Gunnarsson | H04W 48/12 455/446 |
| 2010/0178912 A1* | 7/2010 | Gunnarsson | H04W 24/02 455/423 |
| 2010/0322079 A1* | 12/2010 | Kitazoe | H04W 36/0088 370/241 |
| 2011/0281583 A1* | 11/2011 | Hole | H04W 36/0055 455/436 |

(Continued)

FOREIGN PATENT DOCUMENTS

| | | |
|---|---|---|
| CL | 103004259 A | 3/2013 |
| CN | 101925087 A | 12/2010 |

(Continued)

OTHER PUBLICATIONS

3GPP TS 36.331 v11.0.0 (Jun. 2012).*

(Continued)

*Primary Examiner* — Rina Pancholi

(57) ABSTRACT

Techniques are provided for transmission of measurement reports from a UE to a base station. A method may include receiving a measurement configuration message from a serving cell. The method may include determining a report value from the measurement configuration message, the report value indicating a number of measurement reports to be transmitted to the serving cell. The method may include, based on the number of measurement reports indicated by the report value, determining whether to wait for a signal measurement result of at least one neighboring cell to become available prior to sending a measurement report to the serving cell.

47 Claims, 11 Drawing Sheets

(56) References Cited

U.S. PATENT DOCUMENTS

| | | | | |
|---|---|---|---|---|
| 2012/0115459 A1* | 5/2012 | Deng | ............... | H04W 36/0094 |
| | | | | 455/422.1 |
| 2012/0244903 A1* | 9/2012 | Fong | ....................... | H04W 8/20 |
| | | | | 455/517 |
| 2013/0034006 A1 | 2/2013 | Ishii et al. | | |
| 2013/0130693 A1 | 5/2013 | Salvador et al. | | |
| 2013/0303129 A1* | 11/2013 | Yi | ......................... | H04W 12/02 |
| | | | | 455/411 |

FOREIGN PATENT DOCUMENTS

| | | |
|---|---|---|
| EP | 2410792 A1 | 1/2012 |
| EP | 2439975 A1 | 4/2012 |

OTHER PUBLICATIONS

3GPP TS 36.331 3GPP EUTRA RRC protocol specification V11.0.0 Jun. 2012.*

3GPP TS 36.331: "Technical Specification Group Radio Access Network; Evolved Universal Terrestrial Radio Access (E-UTRA); Radio Resource Control (RRC); Protocol specification," Release 11, vol. 36.331, Version 11.0.0, Jul. 2, 2012 (Jul. 2, 2012), pp. 73-93, XP002716711, paragraph [5 .5 .1] paragraph [5. 5 .4.1] Retrieved from the Internet < URL: http://www.3gpp.org/ftp/Specs/2012-06/Rel-11/36series/ >, [retrieved on Nov. 21, 2013].

International Search Report and Written Opinion—PCT/US2013/052593—ISA/EPO—dated Dec. 6, 2013.

Samsung et al., "CR on measurement report ", 3GPP Draft; R2-124243, 3rd Generation Partnership Project (3gpp), Mobile Competence Centre; 650, Route Des Lucioles; F-06921 Sophia-Antipolis Cedex; France, vol. RAN WG2, no. Qingdao, China; Aug. 13, 2012-Aug. 17, 2012, Aug. 17, 2012 (Aug. 17, 2012), 5 pages, XP050665982, Retrieved from the Internet < URL: http://www.3gpp.org/ftp/tsg_ran/WG2_RL2/TSGR2_79/Docs/ > [retrieved on Aug. 17, 2012] "Summar of Change."

LG Electronics Inc: "Handling of NumberOfReportsSent," 3GPP TSG-RAN2 Meeting #64, R2-086715, Nov. 10-14, 2008, pp. 1-6.

LG Electronics: "One Shot Measurement Issue," 3GPP TSG-RAN WG2 #63, R2-084468, Aug. 18-22, 2008, 7 Pages.

Nokia Corporation: "[64b: 1] DRX and TTT Email Report," 3GPP TSG-RAN WG2 Meeting #65, R2-091122, Feb. 9-13, 2009, 19 pages.

ZTE: "Additional Measurment Reporting," 3GPP TSG-RAN WG2 Meeting #71bis, R2-105344, Oct. 11-15, 2010, 17 pages.

* cited by examiner

DIFFERENTIATING MEASUREMENT REPORTING MECHANISM

CROSS-REFERENCE TO RELATED APPLICATION

The present application for patent claims priority to Provisional Application No. 61/677,726, filed Jul. 31, 2012, entitled "DIFFERENTIATING MEASUREMENT REPORTING MECHANISM", which is assigned to the assignee hereof, and is expressly incorporated in its entirety by reference herein.

BACKGROUND

Field

Aspects of the present disclosure relate generally to wireless communication systems, and more particularly to reporting of cell measurements.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As used herein, a "carrier" refers to a radio band centered on a defined frequency and used for wireless communications.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

The UEs may send feedback information to the base station. For example, the base station may gather information to adjust its transmissions or to determine whether to handover the UE to another base station. The feedback information sent by the UE to the base station may be sent via measurement reports that may include, for example, information relating to cells within range of the UE. In this context, there remains a need for differentiated measurement reporting from the UE to the base station to accommodate different scenarios and requirements in Long Term Evolution (LTE) or the like.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Techniques are provided for measurement reporting by a mobile device in a wireless communication network. The mobile device may be configured by a measurement configuration message. For example, the measurement configuration may include a report amount indicating a total number of measurement reports to be transmitted to a serving cell of the mobile device.

According to one aspect, a method for measurement reporting by a mobile device in a wireless communication network may include receiving a measurement configuration message from a serving cell. The method may include determining a report value from the measurement configuration message, the report value indicating a number of measurement reports to be transmitted to the serving cell. The method may include, based on the number of measurement reports indicated by the report value, determining whether to wait for a signal measurement result of at least one neighboring cell to become available prior to sending a measurement report to the serving cell.

According to another aspect, an apparatus may be configured for measurement reporting in a wireless communication network. The apparatus may include means for receiving a measurement configuration message from a serving cell. The apparatus may include means for determining a report value from the measurement configuration message, the report value indicating a number of measurement reports to be transmitted to the serving cell. The apparatus may include means for determining, based on the number of measurement reports indicated by the report value, whether to wait for a signal measurement result of the at least one neighboring cell to become available prior to sending a measurement report to the serving cell.

According to another aspect, another apparatus may be configured for measurement reporting in a wireless communication network. The apparatus may include a transceiver configured to receive a measurement configuration message from a serving cell and to obtain signal measurements of the serving cell and at least one neighboring cell. The apparatus may also include at least one processor configured to determine a report value from the measurement configuration message, the report value indicating a number of measurement reports to be transmitted to the serving cell. The at least one processor may be configured to determine, based on the number of measurement reports indicated by the report value, whether to wait for a signal measurement result of the at least one neighboring cell to become available prior to sending a measurement report to the serving cell. The apparatus may include a memory coupled to the at least one processor for storing data.

According to another aspect, a computer program product includes a computer-readable medium including code for enabling at least one computer to receive a measurement configuration message from a serving cell. The computer-readable medium includes code for causing at least one computer to determine a report value from the measurement configuration message, the report value indicating a number of measurement reports to be transmitted to the serving cell. The computer-readable medium includes code for causing at least one computer to determine, based on the number of measurement reports indicated by the report value, whether to wait for a signal measurement result of at least one neighboring cell to become available prior to sending a measurement report to the serving cell.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
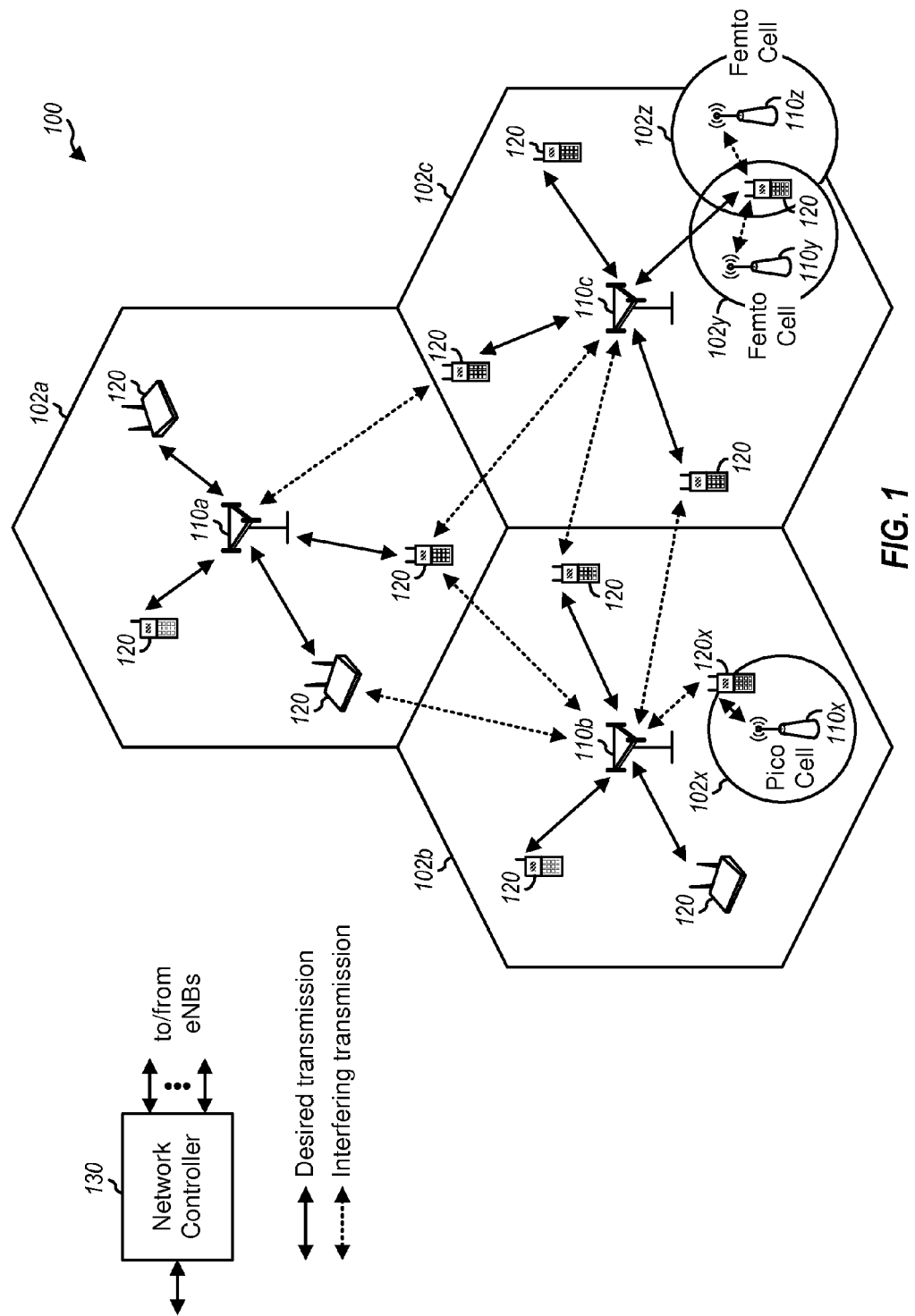
FIG. 1 is a block diagram illustrating aspects of a telecommunications system.

FIG. 1 shows a wireless communication network 100, which may be an LTE network. The wireless network 100 may include a number of eNBs 110 and other network entities. An eNB 110 may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB 110 and/or an eNB 110 subsystem serving this coverage area, depending on the context in which the term is used.

An eNB 110 may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB 110 for a macro cell may be referred to as a macro eNB 110. An eNB 110 for a pico cell may be referred to as a pico eNB 110. An eNB 110 for a femto cell may be referred to as a femto eNB 110 or a home eNB 110 (HNB). In the example shown in FIG. 1, the eNBs 110a, 110b and 110c may be macro eNBs for the macro cells 102a, 102b and 102c, respectively. The eNB 110x may be a pico eNB 110 for a pico cell 102x. The eNBs 110y and 110z may be femto eNBs for the femto cells 102y and 102z, respectively. An eNB 110 may support one or multiple (e.g., three) cells.

The wireless network 100 may be a heterogeneous network that includes eNBs of different types, e.g., macro eNBs, pico eNBs, femto eNBs, etc. These different types of eNBs may have different transmit power levels, different coverage areas, and different impact on interference in the wireless network 100. For example, macro eNBs may have a high transmit power level (e.g., 20 Watts) whereas pico eNBs and femto eNBs may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE 120 may be stationary or mobile. A UE 120 may also be referred to as a terminal, a mobile station, a subscriber unit, a station, etc. A UE 120 may be a cellular phone, a personal digital assistant (PDA), a wireless modem, a wireless communication device, a handheld device, a laptop computer, a cordless phone, a wireless local loop (WLL) station, or other mobile entity. A UE 120 may be able to communicate with macro eNBs, pico eNBs, femto eNBs, or other network entities. In FIG. 1, a solid line with double arrows indicates desired transmissions between a UE 120 and a serving eNB 110, which is an eNB 110 designated to serve the UE 120 on the downlink and/or uplink. A dashed line with double arrows indicates interfering transmissions between a UE 120 and an eNB 110.

A UE 120 may be within the coverage of multiple eNBs 110. One or more of these eNBs 110, at one or more cells, may be selected to serve the UE 120. The serving eNB(s) 110 may be selected based on various criteria such as received power, path loss, signal-to-noise ratio (SNR), etc.

The UE 120 may be configured to perform signal measurements of cells in the vicinity of the UE 120 and report the signal measurements to the serving eNB 110. The serving eNB 110 may send a measurement configuration to direct the UE 120 to perform the signal measurements. Based on the signal measurements of the cells, the serving eNB 110 may, e.g., handover or redirect the UE 120 to another cell. Techniques for differentiated measurement reporting from the UE 120 to the base station are described in further detail below.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
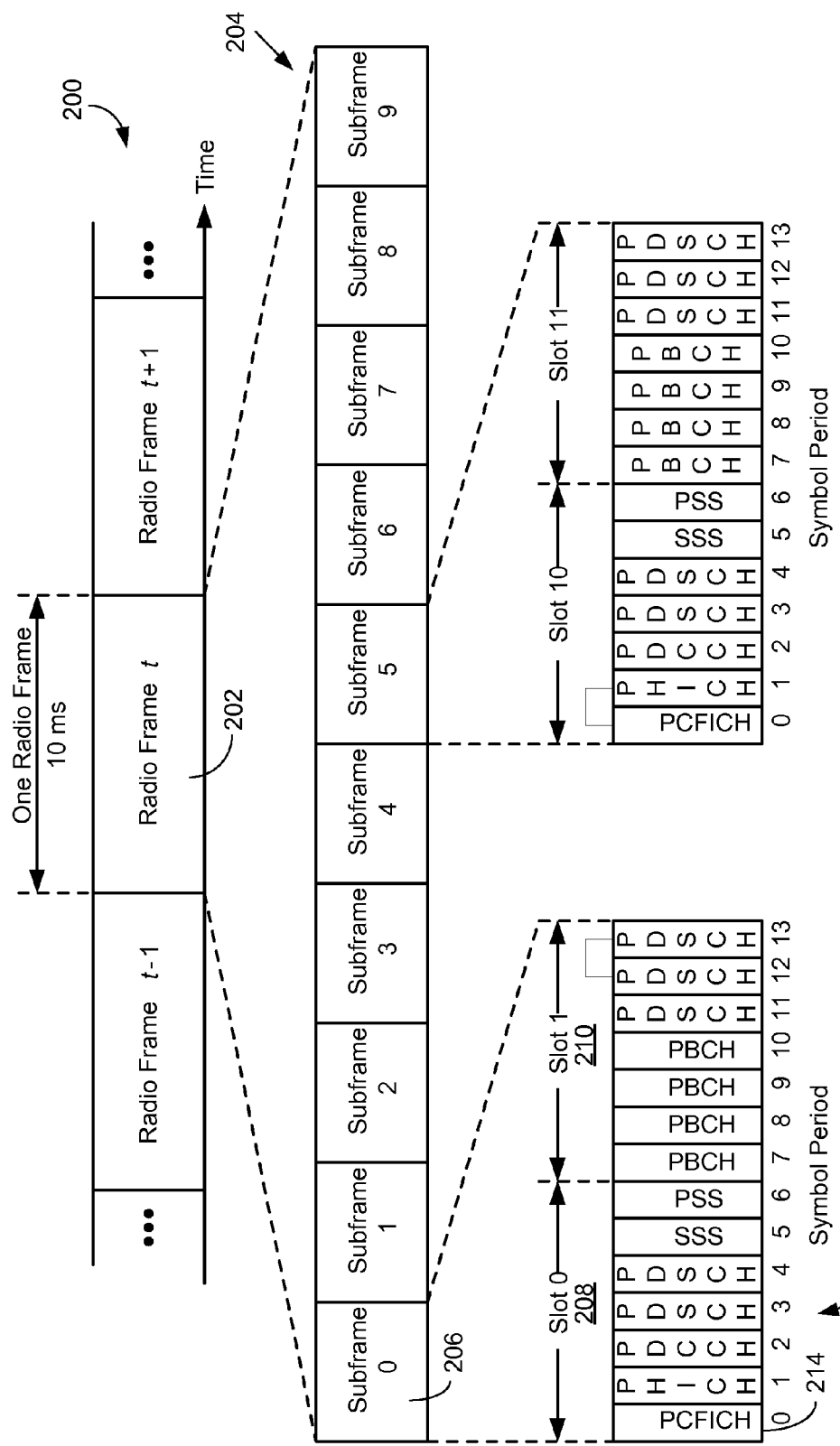
FIG. 2 is a block diagram illustrating an example of a downlink frame structure in a telecommunications system.

FIG. 2 shows a downlink frame structure used in LTE. The transmission timeline for the downlink may be partitioned into units of radio frames 200. Each radio frame, for example, frame 202, may have a predetermined duration (e.g., 10 milliseconds (ms)) and may be partitioned into 10 subframes 204 with indices of 0 through 9. Each subframe, for example 'Subframe 0' 206, may include two slots, for example, 'Slot 0' 208 and 'Slot 1' 210. Each radio frame may thus include 20 slots with indices of 0 through 19. Each slot may include 'L' symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover 'N' subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period 214 in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical H-ARQ Indicator Channel (PHICH) and a Physical Downlink Control Channel (PDCCH) in the first M symbol periods of each subframe (M=3 in FIG. 2). The PHICH may carry information to support hybrid automatic retransmission (H-ARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
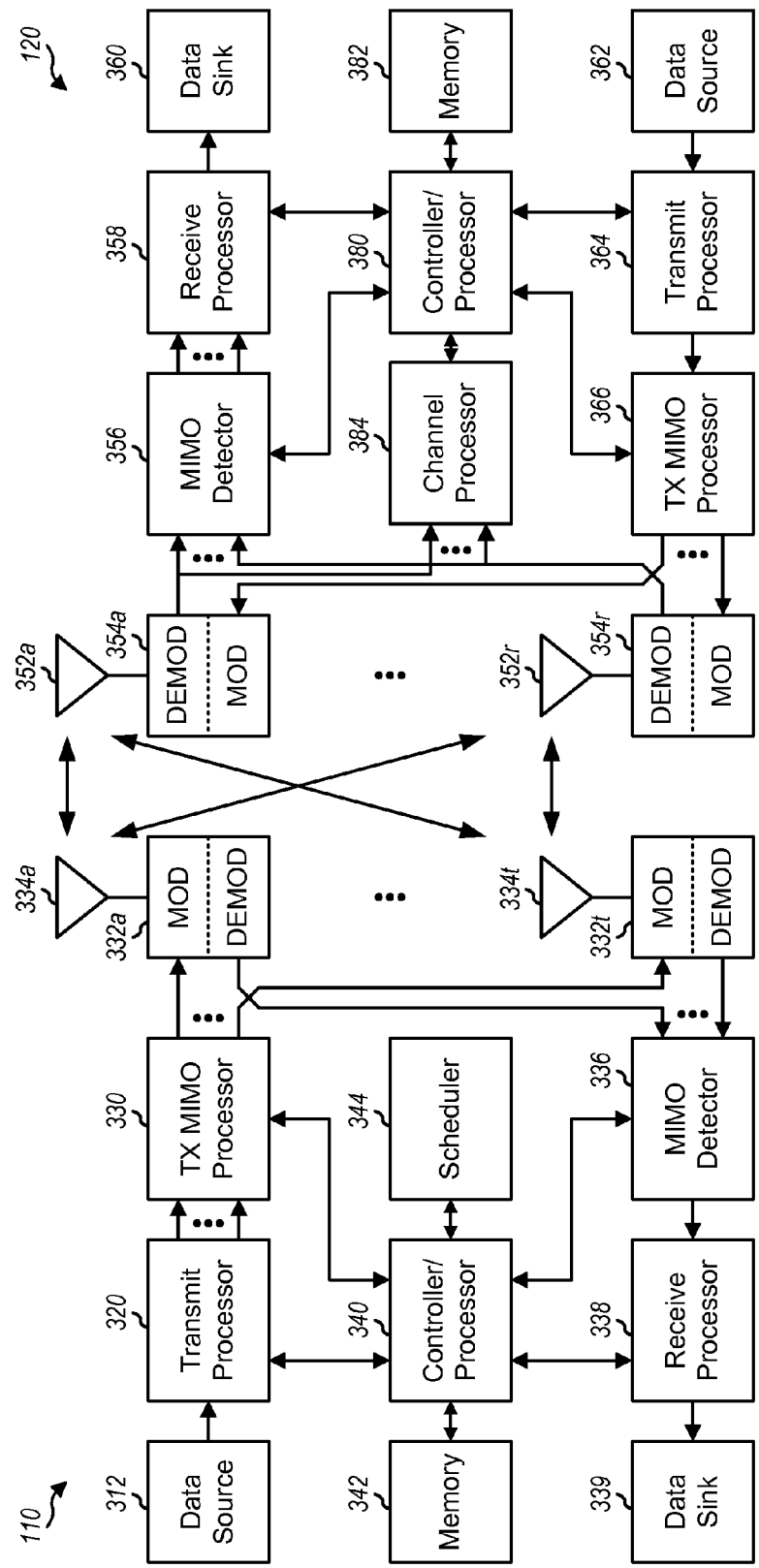
FIG. 3 is a block diagram illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. The base station 110 may also be a base station of some other type. The base station 110 may be equipped with antennas 334*a* through 334*t*, and the UE 120 may be equipped with antennas 352*a* through 352*r*.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332*a* through 332*t*. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332*a* through 332*t* may be transmitted via the antennas 334*a* through 334*t*, respectively.

At the UE 120, the antennas 352*a* through 352*r* may receive downlink signals from the base station 110 and/or neighboring base stations and may provide received signals to the demodulators (DEMODs) 354*a* through 354*r*, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354*a* through 354*r*, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354*a* through 354*r* (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 7A-C, and/or other processes for the techniques described herein. The memories 342 and 382 may store data and program codes for the base station 110 and the UE 120, respectively. A scheduler 344 may schedule UEs for data transmission on the downlink and/or uplink.

As will be readily appreciated, antennas 352, demodulators 354, MIMO detector 356, and/or receive processor 358 may form a receive chain of UE 120 and supply means for receiving and measuring downlink signals. Under the control of processor 380, such means for receiving and measuring signals may be employed to take signal measurements of serving and neighboring base stations and to determine the availability of the same. Additionally, using the receive chain, measurement configuration messages can be obtained which may be utilized by processor 380 to control, for example, signal measurements performed by UE 120. Similarly, antennas 352, modulators 354, transmit processor 364, and/or TX MIMO processor 366 may form a transmit chain of UE 120 and supply means for sending or transmitting uplink signals under the control of processor 380. Such means for sending or transmitting uplink signals can support sending measurement reports that include a result of the signal measurements obtained using the receive chain. As described herein, under control of processor 380, UE 120 may determine when to send a measurement report and the content of a measurement report based on its measurement configuration.

In one aspect, processor 380 includes modules for performing operations of the methods described herein, by executing instructions held in the memory 382. Such modules, for example, may be utilized by processor 380 to control operation of the respective transmit and receive chains. For example, UE 120 may include modules for determining a reporting value from the measurement configuration message. Such modules may include, for example, modules for determining, based on the number of measurement reports indicated by the report value, whether to wait for a signal measurement result of a neighboring cell to become available prior to sending a measurement report to the serving eNB or serving cell.

Figure 4:
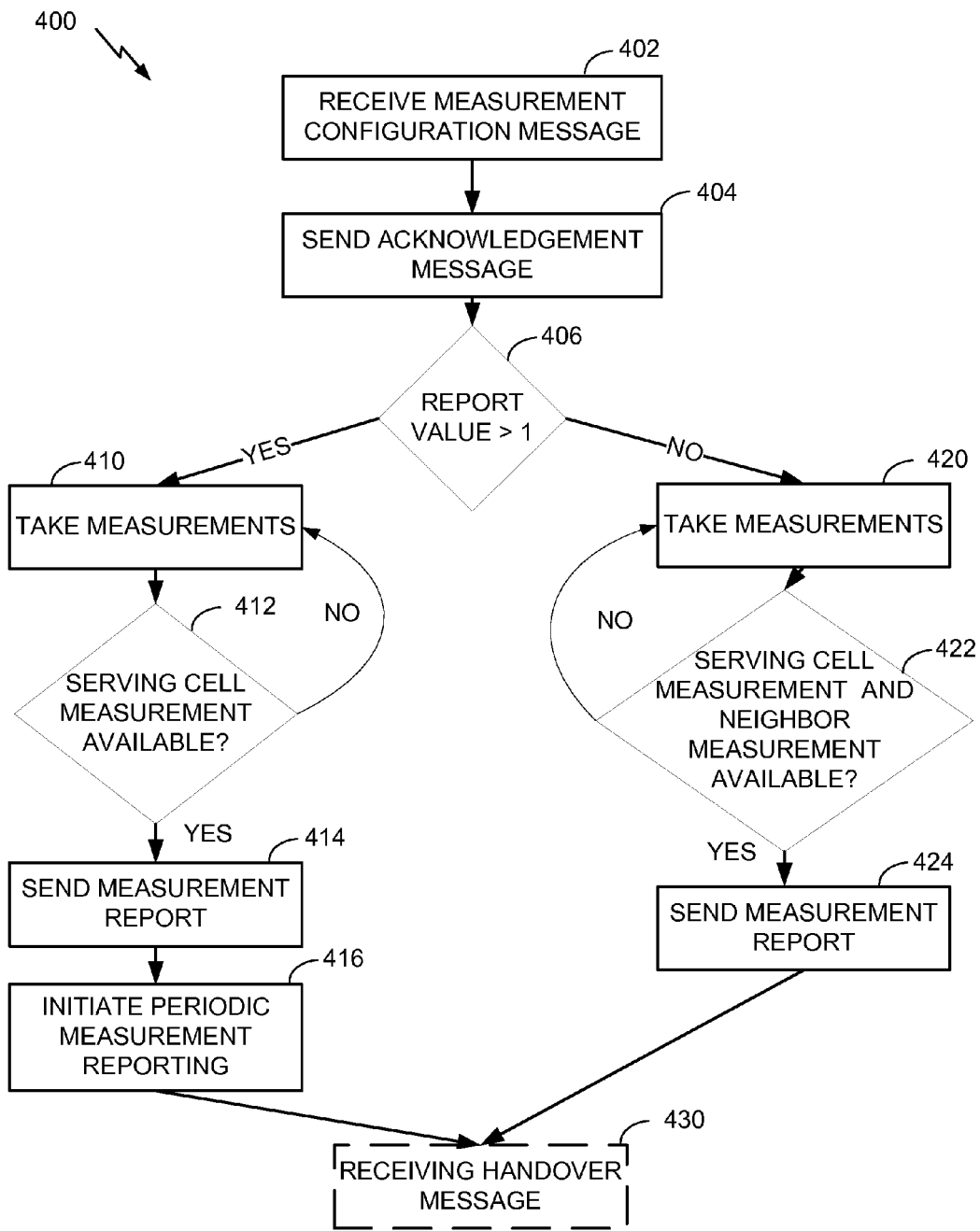
FIG. 4 is a flow diagram illustrating an example measurement reporting procedure based in part on a number of measurement reports requested.

FIG. 4 is a flow diagram illustrating an example measurement reporting procedure based in part on a number of measurement reports requested by an eNB (such as eNB 110) serving a UE (such as UE 120). In one example, the measurement reporting occurs in an LTE network. As part of measurement reporting, the UE may determine signal measurement attributes such as signal quality or signal power of cells in a radio network and send the results to the eNB or the network via the eNB. For example, cell redirection, handover, or reselection may require measurements of cells in the radio network to select the proper cell for moving the UE to the new cell. The eNB may send a measurement configuration message to the UE to direct the UE to initiate measurement reporting to inform the eNB of the neighboring cells.

In the example of FIG. 4, the UE may perform the measurement reporting procedure based on the measurement configuration. At step 402, the UE may receive the measurement configuration message from the serving eNB to configure the UE for measurement reporting. The measurement configuration message is discussed below with respect to FIG. 5A. The measurement configuration message may be sent by the serving eNB via a radio resource control (RRC) connection reconfiguration message. The measurement configuration message may include a report value that indicates a total number of measurement reports for transmission by the UE to the serving eNB. The UE may determine the report value after receiving the measurement configuration message. The report value may be an enumerated value selected from the set of values including, e.g., '1', '2', '4', '8', '16', '32', '64', infinity, etc. The enumerated value may be any positive integer, and the enumeration set may be any set of positive integers.

The UE may proceed with measurement reporting based on the measurement configuration message. At step 404, the UE may send an acknowledgment message to the serving eNB to indicate receipt of the message from the eNB and to indicate configuration of the UE for measurement reporting. For example, the UE may send the acknowledgment message via an RRC connection reconfiguration complete message. As discussed herein, the UE may determine a timing and content of measurement reporting based, at least in part, on the report value. At step 406, the UE may determine whether to proceed with transmission of a single measurement report (i.e., the report value is '1') or multiple measurement reports (i.e., the report value is great than '1'). When the report value indicates a single measurement report is requested, the UE may infer a need to wait for a neighboring cell measurement result to become available. With one-shot measurement reporting, the availability of a targeted signal measurement may represent a top priority. In the case of multiple measurement reports, however, it may not be appropriate to wait for the neighboring cell measurement result if it is not presently available. Instead, when multiple reports are signaled, it may be more important to initiate periodic reporting without delay. In that case, when the report value is greater than '1', the UE may determine not to wait for availability of the neighboring cell measurement result prior to sending the first measurement report. In response to the report value being equal to '1', the UE may determine to wait for availability of the neighboring cell measurement result.

Upon determining a report value great than '1', the UE may proceed to step 410. Steps 410 to 416 may illustrate periodic measurement reporting by the UE for transmitting multiple measurement reports to the eNB. In this periodic measurement reporting procedure, the UE may avoid waiting for availability of the neighboring cell measurement result prior to sending a first measurement report. At step 410, the UE may take measurements, e.g., based on the measurement configuration message. The UE may take measurements of either or both serving cell(s) or neighboring cell(s), based on the measurement configuration message. Since serving cell measurements are used to support communication, they will generally be available for immediate reporting. However, when the UE takes a measurement of a neighboring cell, the measurement result may or may not be readily available. At step 412 the UE may determine whether the measurement results for the serving cell(s) are available. For example, the UE may determine whether at least one measurement result of at least one serving cell is available. If the measurement results for the serving cell(s) are not available ('NO' path), the UE may proceed back to step 410 and may continue to take measurements. If the measurement results for the serving cell(s) are available ('YES' path), the UE may proceed to step 414 to send a measurement report to the eNB. The UE may include the measurement result for the serving cell(s) in the measurement report. The UE may include the measurement results for the neighboring cell(s) in the measurement report if the measurement results for the neighboring cell(s) are available.

After sending the first measurement report, the UE may initiate periodic measurement reporting (step 416) based on the report value. The report value indicates the number of times to repeat the periodic measurement reporting procedure. For example, if the report value indicates 8 measurement reports, the periodic measurement reporting procedure may be repeated 7 times (one measurement report was sent during the first measurement report). In another example, if the report value indicates infinite measurement reports, the periodic measurement reporting procedure may be repeated indefinitely until the UE is instructed (e.g., by the serving eNB) to stop the procedure. In the periodic measurement reporting procedure (step 416), the UE may start a periodic reporting timer and take measurements while the periodic reporting timer is running. The configuration and value for the periodic reporting timer may be based on the measurement configuration message. At the expiration of the periodic reporting timer, the UE may send a measurement report including available measurement results for the serving cell(s) and neighboring cell(s) to the eNB. Following the periodic measurement reporting, the UE may receive a handover message at step 430 from the eNB. In another example, the UE may receive a redirection or reselection message at step 430, or the UE may not receive any indication if no handover is desired.

Returning to step 406, upon determining a report value equal to '1', the UE may proceed to step 420. Steps 420 to 424 may illustrate one-time measurement reporting for the UE to send a single measurement report. In this procedure, the UE may wait for availability of the measurement result of neighboring cell(s) prior to sending the measurement report. For example, the UE may wait for availability of at least one measurement result of at least one neighboring cell prior to sending the measurement report. At step 420, the UE may take measurements, e.g., based on the measurement configuration message. The UE may take measurements of either or both serving cell(s) or neighboring cell(s), based on the measurement configuration message. When the UE takes a measurement of a cell, the measurement result becomes available for inclusion in the measurement report for transmission to the eNB. At step 422 the UE may determine whether the measurement results for the serving cell(s) and the measurement results for the neighboring cell(s) are available. If the measurement results are not available ('NO' path), the UE may then proceed back to step 420 and may continue to take measurements. If the measurement results are available ('YES' path), the UE may proceed to step 424 to send the measurement report to the eNB. The UE may include the measurement results for the serving cell(s) and/or the neighboring cell(s) in the measurement report. Following transmission of the measurement report, the UE may receive a handover message at step 430 from the eNB. In another example, the UE may receive a redirection or reselection message at step 430, or the UE may not receive any indication if no handover is desired.

Figure 5B:
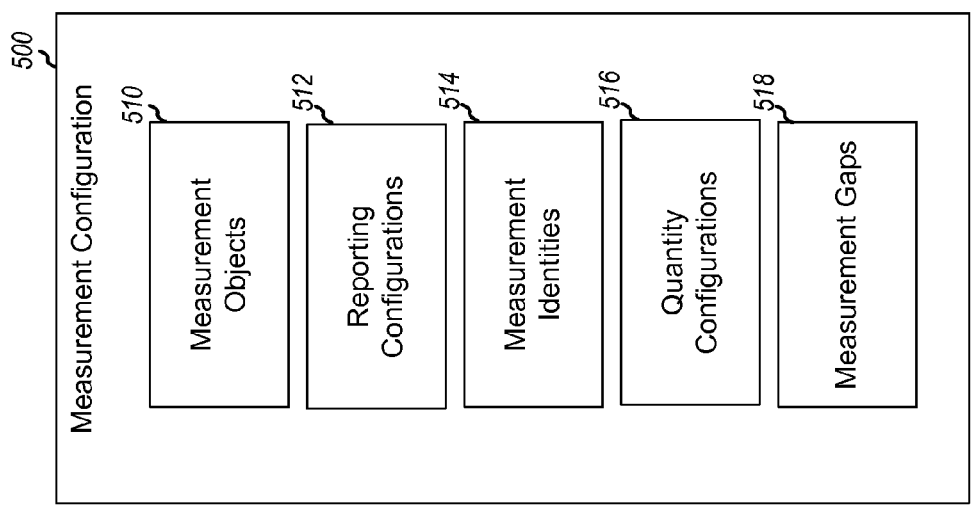
FIG. 5B illustrates an example measurement report sent by a UE.
Figure 5A:
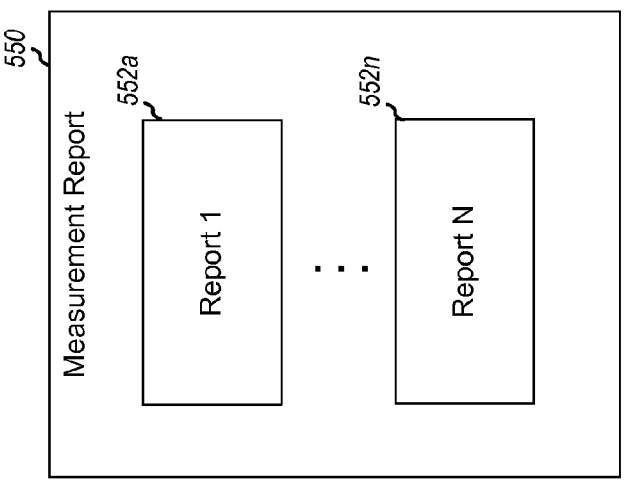
FIG. 5A illustrates an example measurement configuration received by a UE.

FIG. 5A illustrates an example measurement configuration 500 received by the UE. The measurement configuration 500 may be transmitted from the eNB to the UE for configuring measurement reporting by the UE as discussed above. The measurement configuration 500 may be data transmitted in an RRC connection reconfiguration message from the eNB to the UE. The measurement configuration 500 may include measurement objects 510 on which the UE may perform the measurements. For example, the measurement objects 510 may include frequencies and/or cells. The measurement objects 510 may include intra and inter-frequency neighboring cells. The measurement configuration 500 may include a reporting configuration 512, which may include criteria used by the UE to trigger transmission of a measurement report and the quantities (e.g., reference signal received power (RSRP), reference signal received quality (RSRQ)) that the UE includes in the measurement report. The reporting configuration 512 may include a report value that indicates a number of measurement reports for transmission by the UE to the serving eNB. As an example, the reporting configuration 512 may include a 'reportAmount' parameter that may define the report value. The report value may be an enumerated value selected from the set of values including '1', '2', '4', '8', '16', '32', '64', infinity, etc. The reporting configuration 512 may include a parameter to indicate whether to report the strongest cells. When the reporting configuration 512 indicates to report the strongest cells, the UE may consider all neighboring cells as applicable cells for a measurement report. For example, a 'purpose' parameter in the reporting configuration 512 set to 'reportStrongestCells' may indicate to report a number of the strongest cells measured by the UE. The number of strongest cells to report may be included in the reporting configuration 512. The 'purpose' parameter set to 'reportStrongestCells' may configure the UE for periodical measurements for the UE to transmit the measurement reports at a certain time. The measurement configuration 500 may include quantity configurations, which may be the measurement quantities and associated filter used for all evaluations and related reporting according to the RAT. The measurement configuration 500 may include measurement gap 518 information, which may indicate periods of time that the UE may use to perform measurements while in connection mode.

FIG. 5B illustrates an example measurement report 550 transmitted by the UE to the eNB. The measurement report may include data based on the measurement configuration 500 received by the UE. For example, the measurement report 550 may include a number of measurement reports 552a-n for a number of cells, e.g., corresponding to the measurement objects 510. The measurement reports may include the measurement quantities (e.g., RSRQ, RSRP, or the like) based on the measurement configuration 500.

Figure 6A:
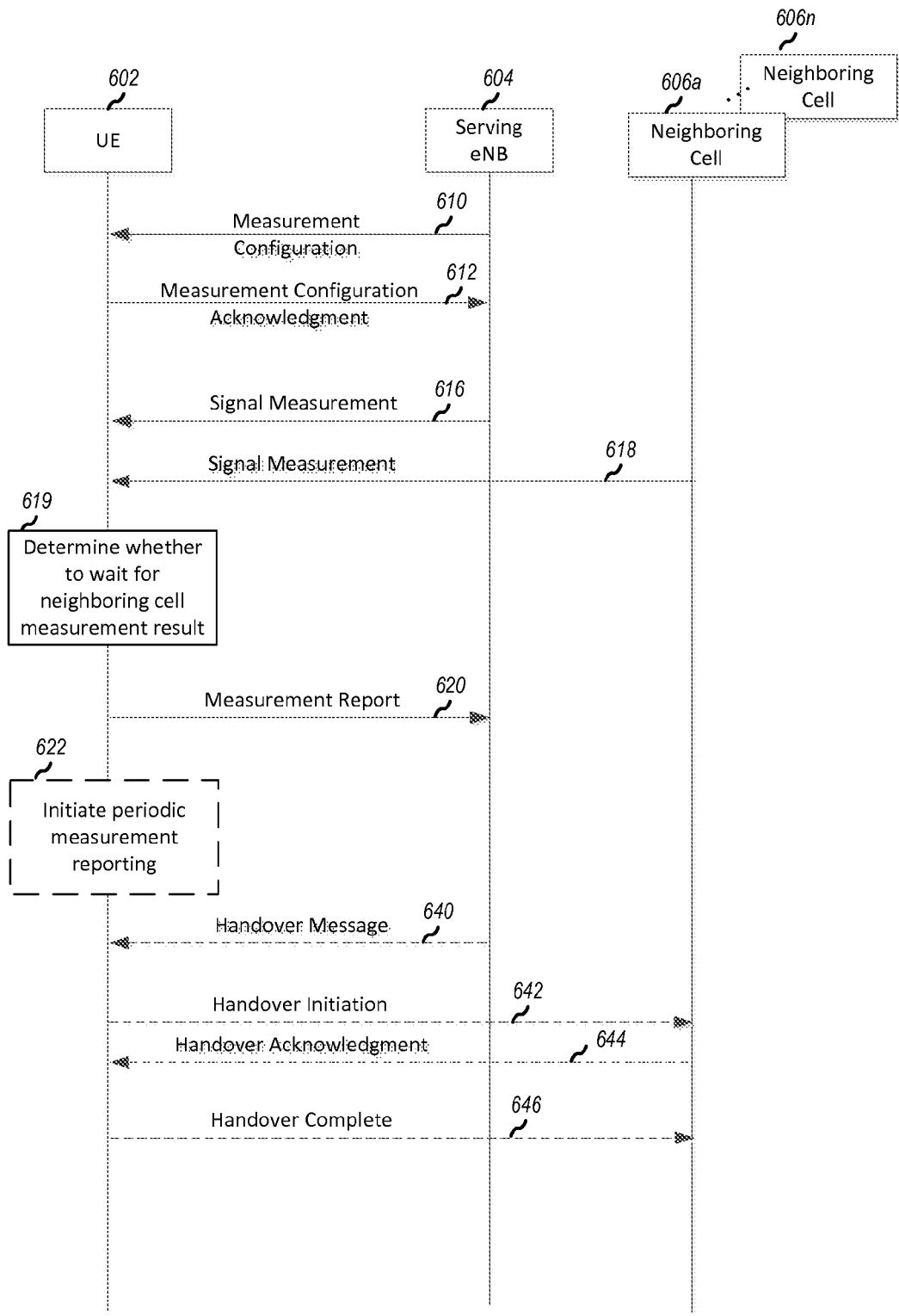
FIG. 6A is a call flow diagram illustrating an example measurement reporting procedure based in part on a number of measurement reports requested.

FIG. 6A is a call flow diagram illustrating an example measurement reporting procedure based in part on a number of measurement reports requested. For example, the procedure in FIG. 6A may be based at least in part on the diagram of FIG. 4. The UE 602 may perform measurement reporting based on a measurement configuration received from the serving eNB 604. At step 610, the serving eNB 604 may send the measurement configuration to the UE 602. For example, the measurement configuration may be sent via an RRC connection reconfiguration message. At step 612, the UE 602 may send to the serving eNB 604 a message acknowledging receipt and configuration of the UE 602 for measurement reporting. For example, the UE 602 may send an RRC connection reconfiguration complete message. The measurement configuration may include a report value that configures for UE 602 for a number of measurement reports to transmit to the serving eNB 604. At steps 616 and 618, the UE 602 may take measurements of the serving cell(s) and/or neighboring cell(s). At step 619, the UE 602 may determine whether to wait for availability of a neighboring cell measurement result before transmitting the measurement report. The measurement result may be a strongest cell of the neighboring cells. The UE 602 may determine whether to wait for the availability based on the report value included in the measurement configuration. At step 620, based on the determination of whether to wait for a neighboring cell measurement result, the UE 602 may send a measurement report to the serving eNB 604. The measurement report may include the serving cell measurement results. The measurement report may include measurement results for the neighboring cell(s).

If the report value indicates multiple measurement reports for transmission to the serving eNB 604, the UE 602 may initiate periodic measurement reporting at step 622. Based on the measurement reports from the UE 602, the serving eNB 604 may determine to move the UE 602 to another cell (e.g., for handover). The serving eNB 604 may send a handover message at step 640 for handover to a target cell. At step 642, the UE 602 may initiate handover to the target cell 606. For example, the UE 602 may initiate a physical random access channel procedure to connect to the target cell 606. The target cell 606 may send a handover acknowledgment at step 644. For example, the handover acknowledgment may be based on the physical random access channel procedure. At step 646, the UE 602 may indicate to the network that handover is complete.

Figure 6B:
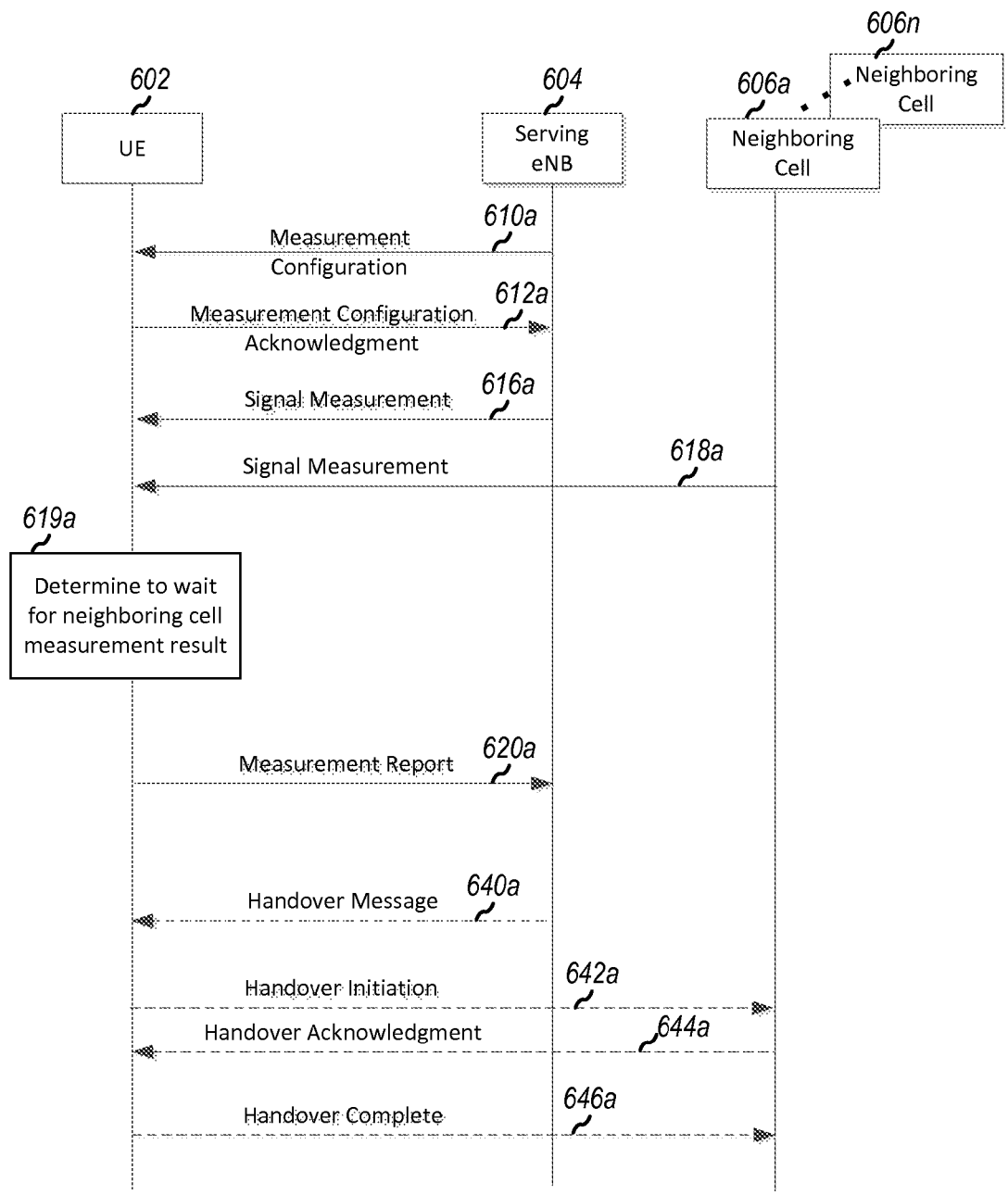
FIG. 6B is a call flow diagram illustrating an example measurement reporting procedure for one example measurement configuration.

FIG. 6B is a call flow diagram illustrating an example measurement reporting procedure for a measurement configuration indicating a one-time measurement report. The procedure in FIG. 6B may be based at least in part on the diagram of FIG. 4. The UE 602 may perform measurement reporting based on a measurement configuration received from the serving eNB 604. In the example of FIG. 6B, the measurement configuration may include a report value indicating a single measurement report (e.g., report value equal to '1'). At step 610a, the serving eNB 604 may send the measurement configuration via the RRC connection reconfiguration message to the UE 602. At step 612a, the UE 602 may send a message acknowledging receipt and configuration of the UE 602 for measurement reporting via the RRC connection reconfiguration complete message to the serving eNB 604. The measurement configuration may include a report value indicating a single measurement report for transmission to the serving eNB 604.

At steps 616a and 618a, the UE 602 may take measurements of the serving cell(s) and neighboring cell(s). At step 619a, the UE 602 may determine to wait for availability of a neighboring cell measurement result before transmitting a measurement report. Because the UE 602 has already taken the measurement of the neighboring cell(s) at step 618a, the measurement results for the neighboring cell(s) are available for inclusion in the measurement report to the serving eNB 604. In another example, if the measurement results for the neighboring cell(s) are not available, the UE 602 may wait until the measurement results for the neighboring cell(s) are available (e.g., after the UE 602 takes the measurements for the neighboring cell(s)) before sending the measurement report. At step 620a, based on the availability of the neighboring cell measurement result, the UE 602 may send the measurement report to the serving eNB 604. The measurement report may include the measurement results for the serving cell(s). The measurement report may include the measurement results for the neighboring cell(s). Based on the measurement report from the UE 602, the serving eNB 604 may determine to move the UE 602 to the neighboring cell with the strongest signal strength. The serving eNB 604 may send a handover message at step 640a for handover to the target cell. At step 642a, the UE 602 may initiate handover to the target cell 606. The target cell 606 may send a handover acknowledgment at step 644a. At step 646a, the UE may indicate to the network that handover is complete.

Figure 6C:
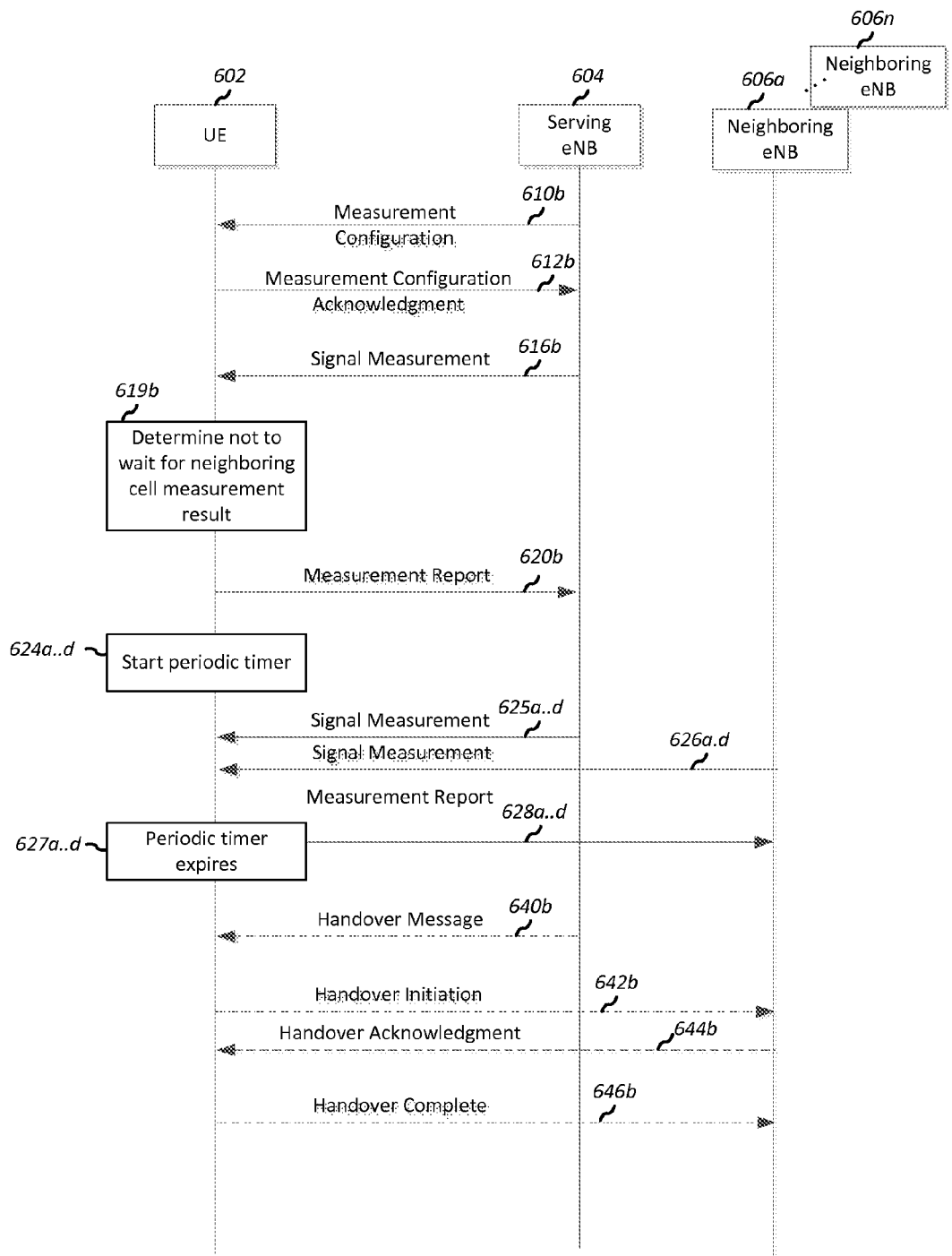
FIG. 6C is a call flow diagram illustrating an example measurement reporting procedure for another example measurement configuration.

FIG. 6C is a call flow diagram illustrating an example measurement reporting procedure for a measurement configuration indicating multiple measurement reports for transmission to the serving eNB 604. The procedure in FIG. 6C may be based at least in part on the diagram of FIG. 4. The UE 602 may perform measurement reporting based on the measurement configuration received from the serving eNB 604. In the example of FIG. 6C, the measurement configuration may include a report value indicating multiple measurement report (e.g., report value equal to '4'). At step 610b, the serving eNB 604 may send the measurement configuration via the RRC connection reconfiguration message to the UE 602. At step 612b, the UE 602 may send a message acknowledging receipt and configuration of the UE 602 for measurement reporting via the RRC connection reconfiguration complete message to the serving eNB 604. The measurement configuration may include a report value indicating multiple measurement reports for transmission to the serving eNB 604.

At step 616a, the UE 602 may take measurements of the serving cell(s). At step 619b, the UE 602 may determine not to wait for availability of a neighboring cell measurement result before transmitting a measurement report. At step 620b, based on the determination not to wait for availability of the measurement result for the neighboring cell(s), the UE 602 may send the first measurement report to the serving eNB 604 without waiting for availability of the measurement result for the neighboring cell(s). In this example, the measurement result for the neighboring cell(s) is not available and the UE 602 may send the first measurement report without regard for the availability of the neighboring cell measurement result. The measurement report may include the serving cell measurement result(s). The measurement report may include any available neighboring cell measurement result(s). After sending the first measurement report at step 620b, the UE 602 may begin periodic measurement reporting at step 627a-d. The UE 602 may start a periodic reporting timer at step 624a-d. At steps 625a-d and 626a-d, the UE 602 may take measurements of the serving cell(s) and neighboring cell(s) while the periodic reporting timer is running. At the expiration of the periodic timer, at step 627a-d, the UE 602 may send a measurement report including measurement result(s) of the serving cell(s) and neighboring cell(s) to the serving eNB 602. Steps 624-627 may repeat for a number of times based on the report value. Based on the measurement reports from the UE 602, the serving eNB 604 may determine to handover the UE 602 to the neighboring cell with the strongest signal strength. The serving eNB 604 may send a handover message at step 640b for handover to the target cell 606. At step 642b, the UE 602 may initiate handover to the target cell 606. The target cell 606 may send a handover acknowledgment at step 644b. At step 646b, the UE may indicate to the network that handover is complete.

Figure 7A:
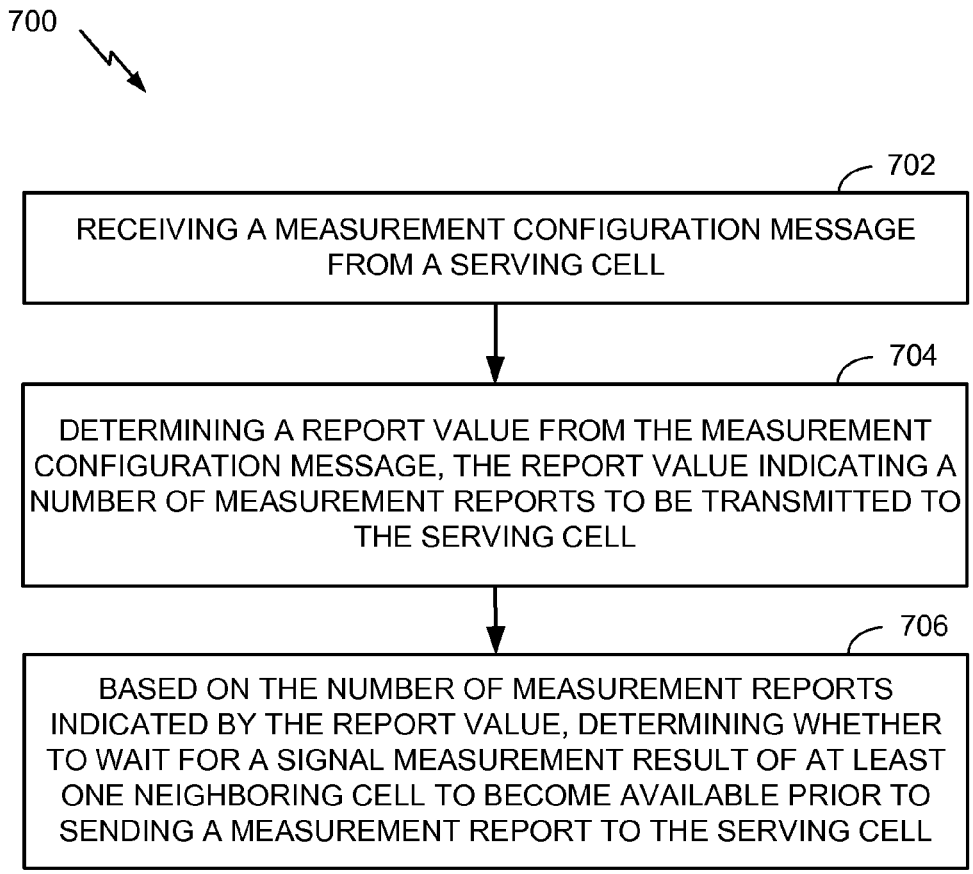
FIGS. 7A-C illustrate aspects of the methodology for measurement reporting.

In accordance with one or more aspects of the present disclosure, with reference to FIG. 7A, there is shown a methodology 700, operable by a mobile device, a wireless entity, a user equipment, wireless device, wireless terminal, or the like. The mobile device may be UE 120 of FIG. 3. Specifically, method 700 describes measurement reporting by the mobile device. The method 700 may include, at 702, receiving a measurement configuration message from a serving cell. For example, step 702 may be performed by the UE 120 of FIG. 3. In an example, step 702 may be performed by antenna 352a-r, or antenna 352a-r coupled to demodulator 354a-r, MIMO detector 356, receive process 358, and/or data sink 360.

The method 700 may include, at 704, determining a report value from the measurement configuration message, the report value indicating a number of measurement reports to be transmitted to the serving cell. For example, step 704 may be performed by the UE 120 of FIG. 3. In an example, step 704 may be performed by processor 380, or processor 380 coupled to memory 382.

The method 700 may include, at 706, based on the number of measurement reports indicated by the report value, determining whether to wait for a signal measurement result of at least one neighboring cell to become available prior to sending a measurement report to the serving cell. For example, step 706 may be performed by the UE 120 of FIG. 3. In an example, step 706 may be performed by processor 380, or processor 380 coupled to memory 382.

Figure 7B:
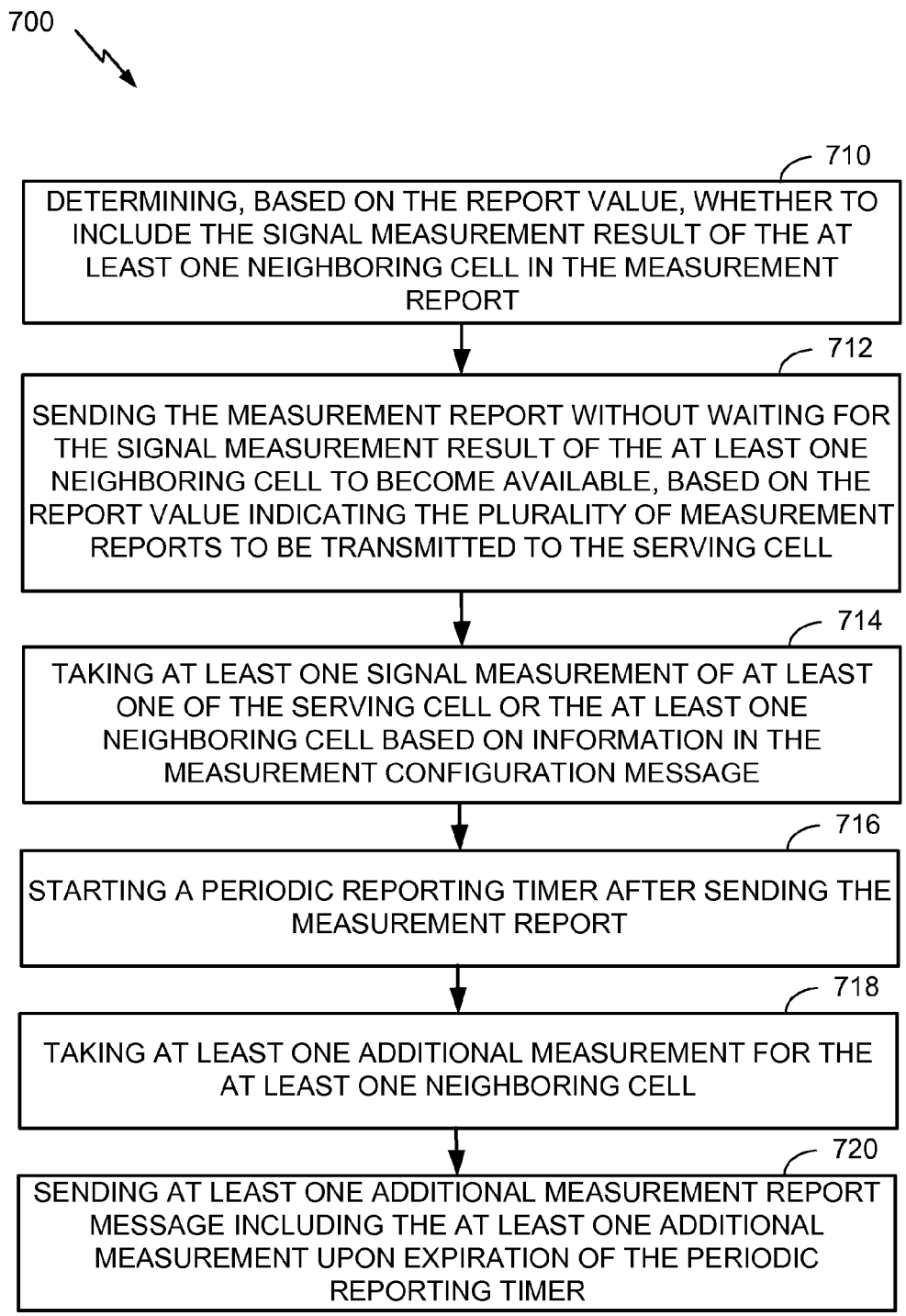

Additional or alternative operations of methodology 700 for measurement reporting are illustrated in FIG. 7B. One or more of operations of FIG. 7B may optionally be performed as part of method 700. The elements of FIG. 7B may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 700 includes at least one of the operations, then the method 700 may terminate after the at least one operation, without necessarily having to include any subsequent downstream operation(s) that may be illustrated.

Referring to FIG. 7B, the additional operations 700 may include, at 710, determining, based on the report value, whether to include the signal measurement result of the at least one neighboring cell in the measurement report. The method 700 may include, at 712, sending the measurement report without waiting for the signal measurement result of the at least one neighboring cell to become available, based on the report value indicating the plurality of measurement reports to be transmitted to the serving cell. The method 700 may include, at 714, taking at least one signal measurement of at least one of the serving cell or the at least one neighboring cell based on information in the measurement configuration message. The method 700 may include, at 716, starting a periodic reporting timer after sending the measurement report. The method 700 may include, at 718, taking at least one additional measurement for the at least one neighboring cell. The method 700 may include, at 720, sending at least one additional measurement report message including the at least one additional measurement upon expiration of the periodic reporting timer.

Figure 7C:
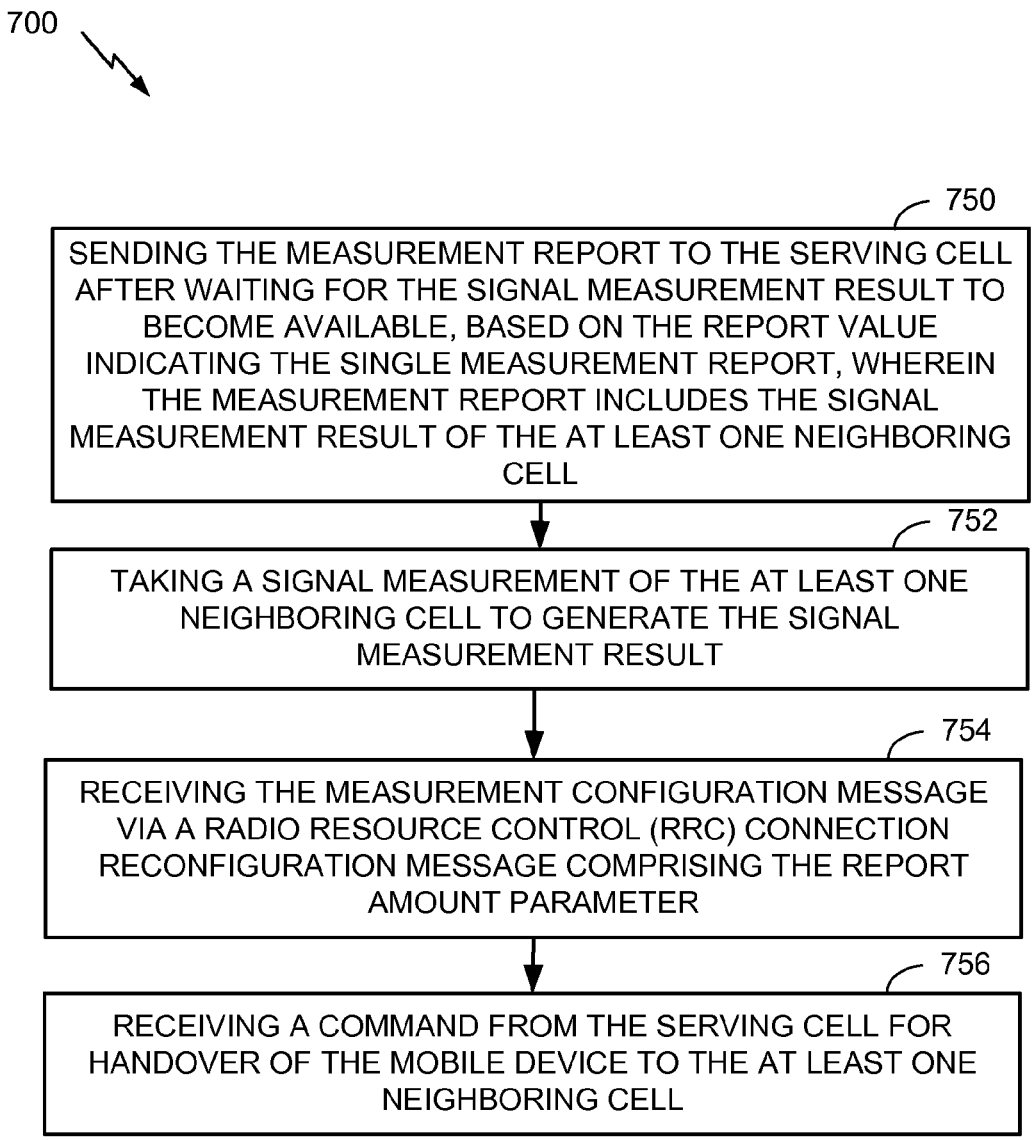

Additional or alternative operations of methodology 700 for measurement reporting, are illustrated in FIG. 7C, for performance by the mobile device. The additional operations 700 may include, at 750, sending the measurement report to the serving cell after waiting for the signal measurement result to become available, based on the report value indicating the single measurement report, wherein the measurement report includes the signal measurement result of the at least one neighboring cell. The method 700 may include, at 752, taking a signal measurement of the at least one neighboring cell to generate the signal measurement result. The method 700 may include, at 754, receiving the measurement configuration message via a RRC connection reconfiguration message comprising the report amount parameter. The method 700 may include, at 756, receiving a command from the serving cell for handover of the mobile device to the at least one neighboring cell.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer-readable storage media and communication media including media that facilitates transfer of a computer program from one place to another. A computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL, are included in the definition of computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for measurement reporting by a mobile device in a wireless communication network, comprising:
   receiving a measurement configuration message from a serving cell;
   determining a report value from the measurement configuration message;
   determining a quantity of measurement reports to be transmitted to the serving cell, wherein the quantity of measurement reports to be transmitted to the serving cell is based on the report value;
   selectively sending, based on the quantity of measurement reports to be transmitted to the serving cell, a measurement report to the serving cell, the selectively sending including:
      sending, when the report value is greater than one, a measurement report for the serving cell to the serving cell when a signal measurement result of the serving cell is available and without waiting for signal measurement results of at least one neighboring cell to become available; and
      sending, when the report value is not greater than one, a measurement report to the serving cell when a signal measurement result of the serving cell is available and after waiting for a signal measurement result of the at least one neighboring cell to become available; and
   initiating, when the report value is greater than one, a periodic measurement reporting process for the serving cell and the at least one neighboring cell after sending the measurement report for the serving cell to the serving cell,
      the periodic measurement reporting process being repeated a number of times and the number of times being based on the report value.

2. The method of claim 1, further comprising:
   determining whether to wait for the signal measurement result to become available based on whether a signal measurement of at least one serving cell has become available.

3. The method of claim 2, wherein sending the measurement report without waiting comprises:
   sending the measurement report based on
      the signal measurement of the at least one serving cell becoming available.

4. The method of claim 1, further comprising:
taking at least one signal measurement of at least one of the serving cell or the at least one neighboring cell based on information in the measurement configuration message.

5. The method of claim 1, further comprising:
performing the periodic measurement reporting process, the periodic measurement reporting process including:
taking at least one measurement for the at least one neighboring cell; and
sending at least one additional measurement report message including the at least one measurement upon expiration of a periodic reporting timer.

6. The method of claim 1, wherein the report value indicates a single measurement report to be transmitted to the serving cell, and the method further comprises:
sending the measurement report to the serving cell after waiting for the signal measurement result to become available, based on the report value indicating the single measurement report, wherein the measurement report includes the signal measurement result of the at least one neighboring cell.

7. The method of claim 6, further comprising:
determining whether to wait for the signal measurement result to become available based on whether a signal measurement of at least one serving cell has become available.

8. The method of claim 7, wherein sending the measurement report to the serving cell after waiting for the signal measurement result to become available comprises:
sending the measurement report based on both the signal measurement result of the at least one neighboring cell becoming available and the signal measurement of the at least one serving cell becoming available.

9. The method of claim 1, wherein the report value comprises a report amount parameter indicating a request for transmission of a single report message or a plurality of report messages from the mobile device to the serving cell.

10. The method of claim 9, further comprising:
receiving the measurement configuration message via a Radio Resource Control (RRC) Connection Reconfiguration message comprising the report amount parameter.

11. The method of claim 10, wherein
the RRC Connection Reconfiguration message further comprises a purpose parameter, and
the method further comprises:
determining whether to wait for the signal measurement result to become available based on whether the purpose parameter indicates, to the mobile device, to report a strongest signal measurement.

12. The method of claim 1, wherein the signal measurement result of the at least one neighboring cell comprises a strongest signal measurement for the at least one neighboring cell.

13. The method of claim 1, further comprising:
receiving a command from the serving cell for handover of the mobile device to the at least one neighboring cell.

14. An apparatus configured for measurement reporting in a wireless communication network, comprising:
means for receiving a measurement configuration message from a serving cell;
means for determining a report value from the measurement configuration message;
means for determining a quantity of measurement reports to be transmitted to the serving cell, wherein the quantity of measurement reports to be transmitted to the serving cell is based on the report value;
means for selectively sending, based on the quantity of measurement reports to be transmitted to the serving cell, a measurement report to the serving cell, the means for selectively sending including:
means for sending, when the report value is greater than one, a measurement report for serving cell to the serving cell when a signal measurement result of the serving cell is available and without waiting for signal measurement results of at least one neighboring cell to become available; and
means for sending, when the report value is not greater than one, a measurement report to the serving cell when a signal measurement result of the serving cell is available and after waiting for a signal measurement result of the at least one neighboring cell to become available; and
means for initiating, when the report value is greater than one and after sending the measurement report for the serving cell to the serving cell, a periodic measurement reporting process for the serving cell and the at least one neighboring cell,
the periodic measurement reporting process being repeated a number of times and the number of times being based on the report value.

15. The apparatus of claim 14, further comprising:
means for determining whether to wait for the signal measurement result to become available based on whether a signal measurement of at least one serving cell has become available.

16. The apparatus of claim 15, wherein the means for sending the measurement report without waiting includes:
means for sending the measurement report based the signal measurement of the at least one serving cell becoming available.

17. The apparatus of claim 14, further comprising:
means for taking at least one signal measurement of at least one of the serving cell or the at least one neighboring cell based on information in the measurement configuration message.

18. The apparatus of claim 14, further comprising:
means for taking at least one measurement for the at least one neighboring cell; and
means for sending at least one additional measurement report message including the at least one measurement upon expiration of a periodic reporting timer.

19. The apparatus of claim 14, wherein the report value indicates a single measurement report to be transmitted to the serving cell, and the apparatus further comprises:
means for sending the measurement report to the serving cell after waiting for the signal measurement result to become available, based on the report value indicating the single measurement report, wherein the measurement report includes the signal measurement result of the at least one neighboring cell.

20. The apparatus of claim 19, further comprising:
means for determining whether to wait for the signal measurement result to become available based on whether a signal measurement of at least one serving cell has become available.

21. The apparatus of claim 20, wherein the means for sending the measurement report to the serving cell after waiting for the signal measurement result to become available includes:
means for sending the measurement report based on both the signal measurement result of the at least one neighboring cell becoming available and the signal measurement of the at least one serving cell becoming available.

22. The apparatus of claim 14, wherein the report value comprises a report amount parameter indicating a request for transmission of a single report message or a plurality of report messages from the apparatus to the serving cell.

23. The apparatus of claim 22, further comprising:
means for receiving the measurement configuration message via a Radio Resource Control (RRC) Connection Reconfiguration message comprising the report amount parameter.

24. The apparatus of claim 23, wherein
the RRC Connection Reconfiguration message further comprises a purpose parameter, and
the apparatus further includes:
means for determining whether to wait for the signal measurement result to become available based on whether the purpose parameter indicates, to the apparatus, to report a strongest signal measurement.

25. The apparatus of claim 14, wherein the signal measurement result of the at least one neighboring cell comprises a strongest signal measurement for the at least one neighboring cell.

26. The apparatus of claim 14, further comprising:
means for receiving a command from the serving cell for handover of the apparatus to the at least one neighboring cell.

27. An apparatus configured for measurement reporting in a wireless communication network, comprising:
a transceiver configured to:
receive a measurement configuration message from a serving cell; and at least one processor configured to:
determine a report value from the measurement configuration message;
determine a quantity of measurement reports to be transmitted to the serving cell, wherein the quantity of measurement reports to be transmitted to the serving cell is based on the report value;
selectively send, based on the quantity of measurement reports to be transmitted to the serving cell, a measurement report to the serving cell and via the transceiver, the processor, when selectively sending the measurement, being configured to:
send, via the transceiver and when the report value is greater than one, a measurement report for the serving cell to the serving cell when a signal measurement result of the serving cell is available and without waiting for signal measurement results of at least one neighboring cell to become available; and
send, via the transceiver and when the report value is not greater than one, a measurement report to the serving cell when a measurement result of the serving cell is available and after waiting for a signal measurement result of the at least one neighboring cell to become available; and
initiate, when the report value is greater than one, a periodic measurement reporting process for the serving cell and the at least one neighboring cell after sending the measurement report for the serving cell to the serving cell,
the periodic measurement reporting process being repeated a number of times and the number of times being based on the report value; and
a memory coupled to the at least one processor for storing data.

28. The apparatus of claim 27, wherein the at least one processor is further configured to:
determine whether to wait for the signal measurement result to become available based on whether a signal measurement of at least one serving cell has become available.

29. The apparatus of claim 28, wherein the at least one processor, when sending the measurement report without waiting, is configured to:
send the measurement report based on
the signal measurement of the at least one serving cell becoming available.

30. The apparatus of claim 27, wherein the at least one processor is further configured to:
take at least one signal measurement of at least one of the serving cell or the at least one neighboring cell based on information in the measurement configuration message.

31. The apparatus of claim 27, wherein the at least one processor is further configured to:
start a periodic reporting timer after sending the measurement report;
take at least one measurement for the at least one neighboring cell; and
the transceiver is configured to:
send at least one additional measurement report message including the at least one measurement upon expiration of the periodic reporting timer.

32. The apparatus of claim 27, wherein
the report value indicates a single measurement report to be transmitted to the serving cell, and
the transceiver is further configured to:
send the measurement report to the serving cell after waiting for the signal measurement result to become available, based on the report value indicating the single measurement report, wherein the measurement report includes the signal measurement result of the at least one neighboring cell.

33. The apparatus of claim 32, wherein the at least one processor is further configured to:
determine whether to wait for the signal measurement result to become available based on whether a signal measurement of at least one serving cell has become available.

34. The apparatus of claim 33, wherein the at least one processor, when sending the measurement report to the serving cell after waiting for the signal measurement result to become available, is configured to:
send the measurement report based on both the signal measurement result of the at least one neighboring cell becoming available and the signal measurement of the at least one serving cell becoming available.

35. The apparatus of claim 27, wherein the report value comprises a report amount parameter indicating a request for transmission of a single report message or a plurality of report messages from the apparatus to the serving cell.

36. The apparatus of claim 35, wherein the at least one processor is further configured to:
receive the measurement configuration message via a Radio Resource Control (RRC) Connection Reconfiguration message comprising the report amount parameter.

37. The apparatus of claim 36, wherein
the RRC Connection Reconfiguration message further comprises a purpose parameter, and the at least one processor is further configured to:
  determine whether to wait for the signal measurement result to become available based on whether the purpose parameter indicates, to the apparatus, to report a strongest signal measurement.

38. The apparatus of claim 27, wherein the signal measurement result of the at least one neighboring cell comprises a strongest signal measurement for the at least one neighboring cell.

39. The apparatus of claim 27, wherein the at least one processor is further configured to:
  receive a command from the serving cell for handover of the apparatus to the at least one neighboring cell.

40. A non-transitory computer-readable medium storing instructions, the instructions comprising:
  one or more instructions which, when executed by a processor of an apparatus, cause the processor to:
    receive a measurement configuration message from a serving cell;
    determine a report value from the measurement configuration message;
    determine a quantity of measurement reports to be transmitted to the serving cell, wherein the quantity of measurement reports to be transmitted to the serving cell is based on the report value;
    selectively send, based on the quantity of measurement reports to be transmitted to the serving cell, a measurement report to the serving cell, the one or more instructions to selectively send the measurement including:
      one or more instructions to send, when the report value is greater than one, a measurement report for the serving cell to the serving cell when a signal measurement result of the serving cell is available and without waiting for signal measurement results of at least one neighboring cell to become available; and
      one or more instructions to send, when the report value is not greater than one, a measurement report to the serving cell when a measurement result of the serving cell is available and after waiting for a signal measurement result of the at least one neighboring cell to become available; and
    initiate, when the report value is greater than one, a periodic measurement reporting process for the serving cell and the at least one neighboring cell after sending the measurement report for the serving cell to the serving cell,
      the periodic measurement reporting process being repeated a number of times and the number of times being based on the report value.

41. The non-transitory computer-readable medium of claim 40, further comprising:
  one or more instructions to determine whether to wait for the signal measurement result to become available based on whether a signal measurement of at least one serving cell has become available.

42. The non-transitory computer-readable medium of claim 41, wherein the one or more instructions to send the measurement report without waiting comprise:
  one or more instructions to send the measurement report based on
    the signal measurement of the at least one serving cell becoming available.

43. The non-transitory computer-readable medium of claim 40, wherein the instructions further comprise:
  one or more instructions to take at least one signal measurement of at least one of the serving cell or the at least one neighboring cell based on information in the measurement configuration message.

44. The non-transitory computer-readable medium of claim 43, wherein the instructions further comprise:
  one or more instructions to start a periodic reporting timer after sending the measurement report;
  one or more instructions to take at least one measurement for the at least one neighboring cell; and
  one or more instructions to send at least one additional measurement report message including the at least one measurement upon expiration of the periodic reporting timer.

45. The non-transitory computer-readable medium of claim 40, wherein the report value indicates a single measurement report to be transmitted to the serving cell, and the instructions further comprise:
  one or more instructions to send the measurement report to the serving cell after waiting for the signal measurement result to become available, based on the report value indicating the single measurement report, wherein the measurement report includes the signal measurement result of the at least one neighboring cell.

46. The non-transitory computer-readable medium of claim 45, wherein the instructions further include:
  one or more instructions to determine whether to wait for the signal measurement result to become available based on whether a signal measurement of at least one serving cell has become available.

47. The non-transitory computer-readable medium of claim 46, wherein the one or more instructions to send the measurement report to the serving cell after waiting for the signal measurement result to become available comprise:
  one or more instructions to send the measurement report based on both the signal measurement result of the at least one neighboring cell becoming available and the signal measurement of the at least one serving cell becoming available.

* * * * *